June 23, 1970 R. J. MAIER 3,517,234
HEAT SINK CONSTRUCTION FOR ELECTRICAL GENERATOR
Original Filed Dec. 5, 1966
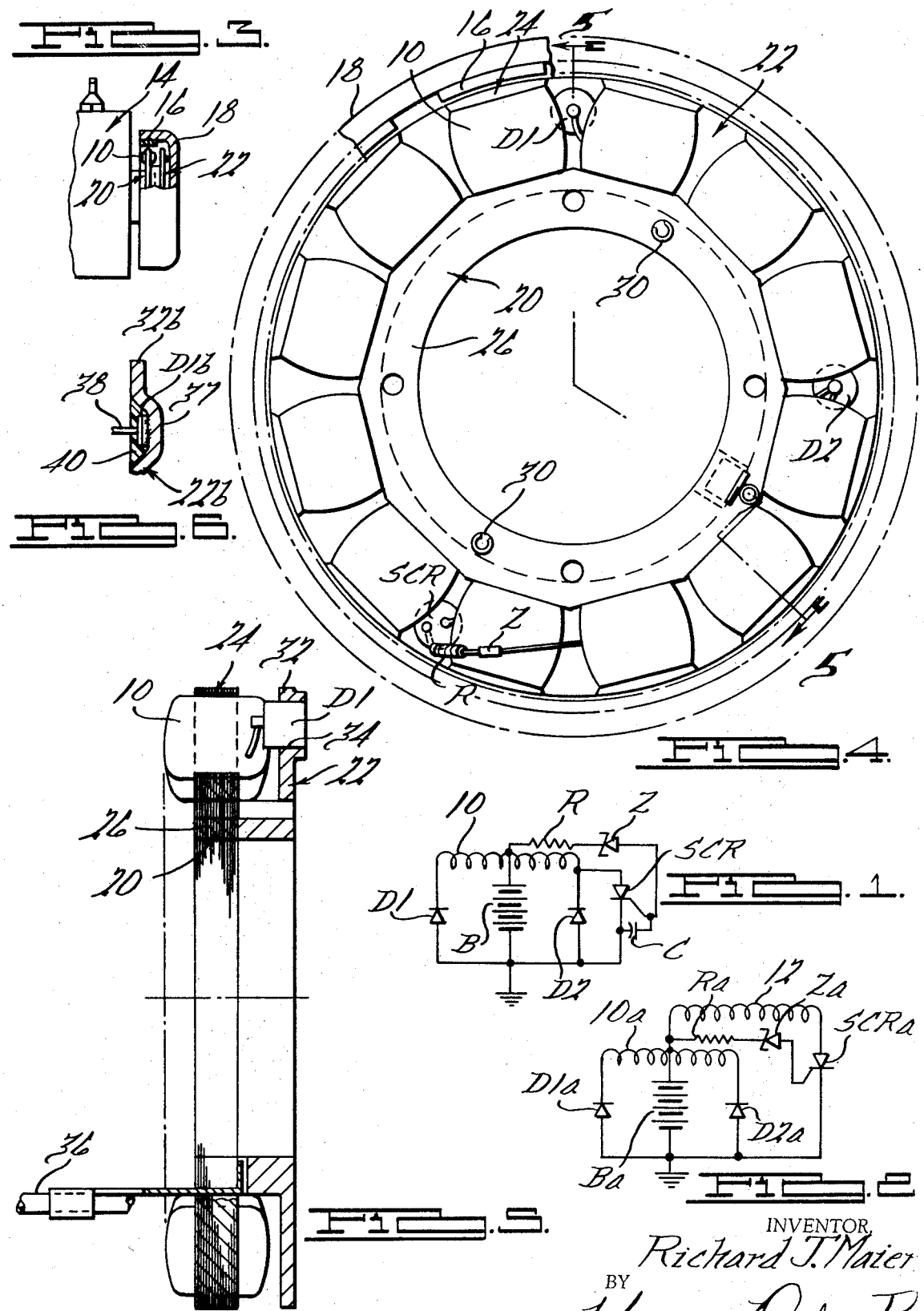
INVENTOR.
Richard J. Maier
BY
Harness, Dickey-Pierce
ATTORNEYS

3,517,234
HEAT SINK CONSTRUCTION FOR ELECTRICAL GENERATOR

Richard J. Maier, Pontiac, Mich., assignor to Syncro Corporation, Oxford, Mich., a corporation of Michigan
Continuation of application Ser. No. 599,173, Dec. 5, 1966. This application July 7, 1969, Ser. No. 842,809.
Int. Cl. H02k *11/00, 7/00*
U.S. Cl. 310—68      9 Claims

ABSTRACT OF THE DISCLOSURE

A combination of a generator and a heat sink for mounting solid state components of a rectifying and regulating circuit and, in addition, a heat sink of a one-piece construction which is used for the return electrical path for some of the solid state components mounted thereon.

Related applications

This is a streamline continuation of application 599,173 filed on Dec. 5, 1966, now abandoned.

Summary background of the invention

The present invention relates to a combination electrical generator and a heat sink construction for the solid state circuitry associated with the generator.

It is an object of the present invention to provide a novel heat sink construction for the components used with an electrical generator.

It is still another object of the present invention to provide a novel heat sink construction which is of a one-piece construction and which is used to define an electrical path for some of the solid state components secured thereto.

It is another object of the present invention to provide a novel combination including a generator and heat sink construction.

Other objects, features, and advantages of the present invention will become apparent from the subsequent description and the appended claims, taken in conjunction with the accompanying drawings, in which:

FIG. 1 is an electrical schematic diagram depicting one form of generating, rectifying and regulating circuitry for use with the present invention;

FIG. 2 is an electrical circuit diagram similar to FIG. 1 depicting a modified circuit form;

FIG. 3 is a fragmentary view depicting the assembly of an alternator and its rectifying and regulating components on an engine;

FIG. 4 is a front elevational view of a combination stator and heat sink construction of the alternator shown in FIG. 3;

FIG. 5 is a sectional view of the construction shown in FIG. 4 taken generally along the line 5—5; and FIG. 6 is a fragmentary view depicting a modified form of heat sink.

Looking now to the drawing, FIG. 1 depicts a circuit diagram for a regulated alternator. A generating winding 10 for an alternator has a center tap connected to the positive side of a battery B which has its negative side connected to ground. A pair of diodes D1 and D2 have their cathodes connected to opposite ends of the generating winding 10 and their anodes connected to a common ground. With the construction as shown, the battery B will be charged by current alternately from opposite halves of the center tapped generating winding 10 through the diodes D1 and D2. Regulation is performed by a controlled rectifier SCR which has its principal electrodes connected across the diode D2 with its cathode being connected to ground and its anode connected to the cathode of the diode D2. The SCR is fired by a gate circuit with the gate of the SCR being connected to the center tap or the positive side of the battery B through a Zener diode Z and a dropping resistor R. A bypass capacitor C is connected between the gate of the SCR and its cathode. Depending upon the characteristics of the Zener diode Z, the magnitude of resistor R, and the magnitude of the potential at the center tap, the SCR will be caused to conduct over various portions of the alternating half cycles to thereby generally provide for a short circuit or low impedance path around the battery B and hence to thereby regulate the potential appearing across the battery B to a preselected magnitude. A modified circuit is shown in FIG. 2. In the circuit of FIG. 2, components similar to like components in the circuit of FIG. 1 are given similar numerical or letter designations with the addition of the postscript "*a*." Similar to the circuit of FIG. 1 in FIG. 2 a generating winding 10*a* is connected at its center tap to a battery B*a* with a pair of diodes D1*a* and D2*a* being electrically connected from the opposite ends of the generating winding 10*a* to ground. A regulating winding 12 is connected from the center tap to the anode of a controlled rectifier SCR*a* which has its cathode connected to ground. The gate circuit of the SCR*a* is connected to the center tap by means of a Zener diode Z*a* and dropping resistor R*a*. In the embodiment shown in FIG. 2 both halves of the generating winding 10*a* can alternately be shunted through the control winding 12 via the SCR*a* over various portions of the half cycles depending upon the potential appearing at the center tap; thus regulation will be provided as the time of conduction of the SCR*a* is varied.

The solid state components, i.e. the diodes and the controlled rectifier, are required to dissipate a substantial amount of heat. In order to prevent overheating, it is desirable that these solid state components be mounted in a heat sink.

In one form of the invention, the alternator, having the generating winding 10, is mounted on an internal combustion engine 14. A plurality of permanent magnets 16 for the alternator are mounted around the periphery of a flanged flywheel 18 which is connected to the crank shaft of the engine 14. The generating winding 10 is mounted as a part of a stator construction 20 which has a heat sink 22 secured thereto with the combination stator 20 and heat sink 22 being fixedly mounted to the engine 14. The diodes D1 and D2 and the controlled rectifier SCR are mounted to the heat sink 22 in a manner to be described. The combination stator 20 and heat sink 22 are fixed from rotation and hence as the flywheel 18 rotates the permanent magnets 16 will generate the desired electrical potential in the generating winding 10. Note that even with the arrangement as shown rotation of the flywheel 18 will cause circulation of cooling air around the solid state components mounted to the heat sink 22 and help in their cooling.

In FIG. 4, an enlarged view of the combination stator 20 and heat sink 22 is shown. The generating winding 10 is wound upon a plurality of circumferentially disposed fingers or poles 24 which extend radially outwardly and are a part of an annular ring shaped core structure 26. The core structure 26 is made from laminations of iron having good magnetic properties and is secured to the heat sink 22 by a plurality of roll pins 30. The heat sink 22 is also ring shaped and is of a one-piece construction and has an outer reduced section flange portion 32. The diodes D1 and D2 and the rectifier SCR are all mounted in the flange portion 32 (see FIGS. 4 and 5). The flange portion is formed with openings such as opening 34 each having a boss at its rearward end with the solid state components such as diode D1 being snugly located therein with a press or slight interference fit. With this construction good thermal contact is made between the diode D1 and the material of the heat sink 22. The heat sink 22 is made of a material which has good thermal conductivity and in the preferred form is made of aluminum. In addition to the thermal conductivity the solid state elements, diodes D1, D2 and the controlled rectifier SCR, are provided to have their outer case as one electrode or conductor. With the diodes D1, D2, the outer case is a grounded anode while with the controlled rectifier SCR the outer case is a grounded cathode. Thus the diodes D1, D2 and controlled rectifier SCR are placed in electrical contact with the heat sink 22 which acts as a common conductor for these components. Since the heat sink 22 is securely connected to the core 26 and is likewise securely connected to the engine 14, the return or ground path to the battery B from the elements D1, D2 and SCR extends through the heat sink 22 through the engine, etc. This is significant since normally the battery is at a location remote from the flywheel. Thus only one conductor 36 need be connected from the battery B to the alternator and this conductor 36 is connected to the center tap of the control winding 10.

Note that by using a center tapped construction as shown, only two diodes need be utilized with both having the same electrode (anode) similarly connected to a common electrical connection to the heat sink 22. In FIG. 4 the Zener diode Z and resistor R are shown connected to the electrodes of the SCR.

A different construction is shown in FIG. 6 in which components similar to that shown in the previous figures are given similar numerical or letter designations with the addition of the letter postscript "b." Thus the flange portion 32b of the heat sink ring 22b is shown to be dished at selected points 37 along its periphery. The diode D1b is in the form of a silicon chip and is located in the dished portion 37 and has a conductor 38 extending therefrom which is connected to the cathode of the diode D1b. The silicon chip diode D1b is secured or bonded to the dished portion 36 by means of a resin and can be sealed by a plastic coating 40. The silicon chip diode D1b could be soldered to the material of the dish portion 36. With this construction the separate container acting as one conductor (to the anode) of the diodes, which container is utilized to electrically contact the heat sink 22b, can be eliminated and contact made directly to the other electrode of the silicon chip diode D1b.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:
1. In an electrical generating system for charging a battery for an engine said system including: an electrical generator, rectifying circuit means electrically connected to and operating on the electrical generator for providing a rectified output for charging the battery, said means comprising a plurality of solid state conduction devices, and a common heat sink for mounting at least some of said devices in heat conducting relationship, said heat sink being secured to a portion of the engine in electrical contact therewith, said heat sink being made of a material having good thermal and electrical conductivity and with said some of said devices having one electrode electrically connected to said heat sink and with said heat sink defining a common electrical path for all of the electrodes thus connected, said some of said devices including a pair of diodes, said generator having a stator with a generating winding having a center tap, first electrical circuit means connecting one end of the battery to said center tap on said winding and connecting the other end of the battery to said one electrode through the engine portion and through said common electrical path through the heat sink.

2. The system of claim 1 with at least one of said devices being in a chip form and being mounted in electrical contact with and sealed directly to said heat sink.

3. The system of claim 1 with all of said devices being electrically and thermally connected to said heat sink and with said devices including a controlled conduction device.

4. The system of claim 1 further including second electrical circuit means connecting the other electrode of each of said diodes to an opposite end of the winding and regulating circuit means electrically connected to the winding and including a controlled conduction device mounted on said heat sink in heat conducting relationship with one electrode in electrical contact therewith.

5. The system of claim 1 with the stator having a laminated iron core member and further comprising means for holding said core member and heat sink in engaging relation.

6. The system of claim 1 with the generator mounted for operation by an engine having a rotatable shaft and a flywheel further comprising a plurality of permanent magnets located circumferentially about the flywheel with the generating winding located proximate to said magnets whereby a potential is generated therein as said flywheel is rotated and with said first electrical circuit means including an electrical path through the body of the engine.

7. The system of claim 6 further including second electrical circuit means connecting the other electrode of each of said diodes to an opposite end of the winding and regulating circuit means electrically connected to the winding and including a controlled conduction device mounted on said heat sink in heat conducting relationship with one electrode in electrical contact therewith.

8. The system of claim 7 with the stator having a laminated iron core member and further comprising means for holding said core member and heat sink in engaging relation.

9. The system of claim 8 with at least one of said devices being in a chip form and being mounted in electrical contact with and sealed directly to said heat sink.

References Cited
UNITED STATES PATENTS

| | | | |
|---|---|---|---|
| 3,105,932 | 10/1963 | Burson | 322—90 |
| 3,270,268 | 8/1966 | Carmichael | 320—61 |
| 3,353,090 | 11/1967 | Sawyer | 322—30 |
| 3,358,665 | 12/1967 | Carmichael | 123—148 |
| 3,400,318 | 9/1968 | Hill | 320—41 |

J D MILLER, Primary Examiner

U.S. Cl. X.R.

123—148; 310—66, 67; 320—61; 322—41, 93, 94